(12) United States Patent
Kumagai et al.

(10) Patent No.: US 10,166,891 B2
(45) Date of Patent: Jan. 1, 2019

(54) VEHICULAR SEAT

(71) Applicant: TACHI-S CO., LTD., Akishima-shi, Tokyo (JP)

(72) Inventors: Kotaro Kumagai, Akishima (JP); Atsushi Ishii, Akishima (JP); Atsushi Koike, Akishima (JP)

(73) Assignee: TACHI-S CO., LTD., Akishima-Shi, Tokyo (JP)

( * ) Notice: Subject to any disclaimer, the term of this patent is extended or adjusted under 35 U.S.C. 154(b) by 104 days.

(21) Appl. No.: 14/897,770

(22) PCT Filed: Mar. 26, 2015

(86) PCT No.: PCT/JP2015/059527
§ 371 (c)(1),
(2) Date: Dec. 11, 2015

(87) PCT Pub. No.: WO2015/159680
PCT Pub. Date: Oct. 22, 2015

(65) Prior Publication Data
US 2016/0121769 A1 May 5, 2016

(30) Foreign Application Priority Data
Apr. 14, 2014 (JP) .................. 2014-082918

(51) Int. Cl.
B60N 2/58 (2006.01)
B60N 2/70 (2006.01)
(Continued)

(52) U.S. Cl.
CPC ......... B60N 2/5816 (2013.01); B60N 2/5825 (2013.01); B60N 2/5858 (2013.01);
(Continued)

(58) Field of Classification Search
CPC .. B60N 2/5816; B60N 2/5825; B60N 2/5858; B60N 2/70; B60N 2/7005; B60N 2/72; A47C 31/023; A47C 31/026
See application file for complete search history.

(56) References Cited

U.S. PATENT DOCUMENTS 659,251 A * 10/1900 Nerad ................ A47C 31/11
24/681
1,820,104 A * 8/1931 Whaley ............... A47C 31/11
297/224
(Continued)

FOREIGN PATENT DOCUMENTS

DE 2340831 * 8/1973
EP 1 048 246 A1 11/2000
(Continued)

OTHER PUBLICATIONS

Extended European Search Report dated Aug. 17, 2016.
International Search Report (ISR) (PCT Form PCT/ISA/210), in PCT/JP2015/059527, dated Jun. 23, 2015.

Primary Examiner — Robert Canfield
(74) Attorney, Agent, or Firm — McGinn I.P law Group, PLLC.

(57) ABSTRACT

Provided is an inexpensive, easy-to-assemble vehicular seat having few components. The vehicular seat 1A has a surface skin 13 and a backboard 12 to which the surface skin 13 is attached, wherein the surface skin 13 has a first surface skin 13a and a second surface skin 13b connected to the first surface skin 13a, protruding members 16 and holes 17 are provided as a connecting structure for connecting the backboard 12 and the second surface skin 13b, and the second surface skin 13b is formed from a soft material such as an elastomer.

18 Claims, 6 Drawing Sheets

(51) Int. Cl.
*B60N 2/72* (2006.01)
*B60N 2/60* (2006.01)

(52) U.S. Cl.
CPC ............ *B60N 2/6009* (2013.01); *B60N 2/70* (2013.01); *B60N 2/7005* (2013.01); *B60N 2/72* (2013.01)

(56) References Cited

U.S. PATENT DOCUMENTS

| | | | | | |
|---|---|---|---|---|---|
| 1,889,662 | A | * | 11/1932 | Hyman | B60N 2/60 297/224 |
| 1,947,130 | A | * | 2/1934 | Gustav | F16B 5/0642 24/295 |
| 2,349,226 | A | * | 5/1944 | Thomas | E06B 9/54 160/273.1 |
| 2,728,382 | A | * | 12/1955 | Baranski | A47C 31/02 297/218.3 |
| 3,066,435 | A | * | 12/1962 | Oddo | A47C 31/11 108/90 |
| 3,102,755 | A | * | 9/1963 | Wilfert | B60N 2/5825 297/218.1 |
| 3,765,039 | A | * | 10/1973 | Ewoldt | A47C 31/026 297/219.1 |
| 3,981,534 | A | * | 9/1976 | Wilton | A47C 7/185 297/218.1 |
| 4,019,776 | A | * | 4/1977 | Takamatsu | B60N 2/6027 297/218.1 |
| 4,232,898 | A | * | 11/1980 | Bodrero | B60N 2/6027 297/224 |
| 4,561,695 | A | | 12/1985 | MacCready | |
| 4,699,427 | A | * | 10/1987 | Kobayashi | B29D 99/0092 297/452.27 |
| 4,740,034 | A | * | 4/1988 | Snyder | A47C 9/00 248/345.1 |
| 4,789,201 | A | * | 12/1988 | Seibert | B60N 2/5825 297/218.1 |
| 5,560,677 | A | * | 10/1996 | Cykana | B60N 2/5825 297/218.3 |
| 5,826,939 | A | * | 10/1998 | Beyer | B60N 2/5825 24/369 |
| 6,375,269 | B1 | * | 4/2002 | Maeda | A47C 7/282 297/218.2 |
| 7,207,627 | B2 | * | 4/2007 | Jerome | A47C 31/02 297/219.1 |
| 2004/0227335 | A1 | * | 11/2004 | Acker | B60N 2/5841 280/730.2 |
| 2006/0163850 | A1 | | 7/2006 | Inazu et al. | |
| 2006/0214485 | A1 | * | 9/2006 | Brockschnieder | B60N 2/449 297/228.11 |
| 2013/0249269 | A1 | * | 9/2013 | Sasaki | B60N 2/5825 297/452.18 |
| 2015/0183350 | A1 | * | 7/2015 | Schittko | B60N 2/5825 297/452.48 |

FOREIGN PATENT DOCUMENTS

| | | | |
|---|---|---|---|
| EP | 1 803 376 A1 | 7/2007 | |
| FR | 1 223 120 A | 6/1960 | |
| FR | 2 847 534 A1 | 5/2004 | |
| JP | S 50-135406 U | 11/1975 | |
| JP | S 61-47898 U | 3/1986 | |
| JP | S 62-40959 U | 3/1987 | |
| JP | S 63-131700 U | 8/1988 | |
| JP | H 02-132500 U | 11/1990 | |
| JP | H 03-112585 A | 5/1991 | |
| JP | 2001-169868 A | 6/2001 | |
| JP | 2003290577 A * | 10/2003 | ........... B29C 65/606 |
| KR | 100 468 036 B1 | 1/2005 | |
| WO | WO 2012/172674 A1 | 12/2012 | |

* cited by examiner (a) ENLARGED

VEHICULAR SEAT

TECHNICAL FIELD

The present invention relates to a vehicular seat used in an automobile or another ridden object. In particular, the present invention relates to a vehicular seat having a structure in which a surface skin formed from hide, leather, cloth, or the like is fixed to a frame or other type of base.

BACKGROUND ART

Typically, a vehicular seat has a seat cushion, which is the portion on which the gluteal region of an individual is placed, and a seat back extending upright from the rear part of the seat cushion. The seat back is the portion into which the person sitting in the seat cushion leans their back.

The seat back and seat cushion each have a frame, a pad supported on the frame, and a surface skin covering the pad. The surface skin covers the outer surface of the pad. An end portion of the surface skin is fixed to the frame via an attachment member.

A structure for fixing the end portion of a surface skin to the frame has been disclosed in, e.g., Patent Citation 1. In this fixing structure, a hard plate is placed on the end portion of the surface skin, and the end portion of the surface skin and brackets extending from the frame are connected by screws passed through the end portion of the surface skin and the hard plate.

In Patent Citation 2, clips and pawls are formed on resin plates which are fixed on ends of a seat cover, while holes for the clips to engage and holes for the pawls to engage are formed in a frame. Then, the seat cover is secured to the frame via the clips, the pawls and the holes.

CITATION LIST

Patent Literature

Patent Citation 1: Japanese Laid-open Patent Publication No. 2001-169868
Patent Citation 2: Japanese Laid-open Utility Model Publication No. H02-132500

SUMMARY OF THE INVENTION

Technical Problem

However, the conventional device of Patent Citation 1 described above has had problems in that because the surface skin end and brackets are fastened using screws and nuts fitted on the screws, a large number of components are used, leading to higher costs, and increased difficulty in assembling the surface skin on the frame.

The conventional device of Patent Citation 2 has had problems in that, at least three resin plates are needed for the seat cushion of the vehicular seat, increasing the number of components. Furthermore, great force is required of workers to secure the hard resin plates to the frame, presenting another problem in that the device is not easy to assemble.

The present invention was devised in view of the above-described problems with conventional devices, it being a purpose of the invention to provide a vehicular seat of which there is a reduced number of components, the cost is low, and assembly is easy.

Solution to Problems

The vehicular seat according to the present invention is a vehicular seat comprising a surface skin and a base to which the surface skin is attached, wherein: the surface skin comprises a first surface skin and a second surface skin that is connected to the first surface skin; a connecting structure for connecting the base and the second surface skin is provided; and the second surface skin is formed from a soft material.

The vehicular seat is, e.g., a seat for an automobile, a seat for another type of ridden object, or the like. This vehicular seat comprises, e.g., a seat cushion and a seat back. The present invention can be applied to a seat cushion, and can also be applied to a seat back.

The soft material is an elastomer, a soft resin, a molded non-woven cloth, a similar material, or a combination thereof. The elastomer is a rubbery and elastic industrial material.

The base is, e.g., a pipe frame, a backboard supported on a pipe frame, a backboard which is itself a skeletal structure, a side cover of a seat cushion, or the like.

With the vehicular seat described above, there are significantly fewer components and cost is lower than in cases such as the vehicular seat disclosed in Patent Citation 1, which uses fastening means composed of screws, nuts, brackets, a hard plate, and the like.

Because the second surface skin connected to the base is formed from a soft material such as an elastomer, the surface skin is more easily handled, and as a result, the surface skin is more easily assembled on the base than in cases in which the second surface skin is formed from a common material for surface skins such as hide, leather, or the like.

In the vehicular seat according to the present invention, the second surface skin may be connected to the peripheral edge of the first surface skin. Specifically, the end of the second surface skin may be stitched to the peripheral edge of the first surface skin. The second surface skin may be connected to the entire peripheral edge of the first surface skin, or it may be provided to one portion of the peripheral edge of the first surface skin.

In the vehicular seat according to the present invention, the first surface skin may be formed from hide, leather, synthetic leather, cloth, a similar material, or a combination thereof. The soft material forming the second surface skin may be formed from an elastomer, a soft resin, a molded non-woven, a similar material, or a combination thereof. Due to the second surface skin being formed from a soft material, the second surface skin can have the property of maintaining a predetermined shape in a natural state, i.e., shape-retaining properties.

In the vehicular seat according to the present invention, the connecting structure may have protruding members provided to one of the base and the second surface skin, and holes provided to the other of the base and the second surface skin. The second surface skin may be connected to the base by the protruding members being inserted into the holes. With this configuration, when the surface skin is attached to the base it is sufficient merely to insert the protruding members into the holes, and assembly is significantly easier than when using fastening means composed of screws and the like.

In the vehicular seat according to the present invention, the tips of the protruding members may be large-diameter portions, and the large-diameter portions are larger in diameter than the holes but are preferably shaped to be able to pass through the holes. The following method is a possible example of how to enable the large-diameter portion to pass through the holes of smaller diameter. Specifically, the large-diameter portion is integrally molded by the same soft material as the second surface skin, and large-diameter portions may be passed through the holes while being elastically deformed.

In the vehicular seat according to the present invention, the soft material has shape-retaining properties such that the shape thereof can be maintained in a natural state, and the connecting structure is realized by the shape-retaining properties of the soft material. With this configuration, because the soft material functions as a connecting structure, no connecting structure other than the soft material is needed and the number of components can be further reduced.

In the vehicular seat according to the present invention, the base may be either a frame as a constituent element of a seat back into which the sitter leans their back, a backboard supported on a frame as a constituent element of a seat back, or a backboard that functions as a frame.

In the vehicular seat according to the present invention, the base can be either a frame as a constituent element of a seat cushion on which the sitter rests their gluteal area, or a side cover as a constituent element of a seat cushion.

Advantageous Effects of Invention

With the vehicular seat according to the present invention, there are significantly fewer components and cost is lower than in cases such as the vehicular seat disclosed in Patent Citation 1, which uses fastening means composed of screws, nuts, brackets, a hard plate, and the like.

Because the second surface skin connected to the base is formed from a soft material such as an elastomer, the surface skin is more easily handled, and as a result, the surface skin is more easily assembled on the base than in cases in which the second surface skin is formed from a common material for surface skins such as hide, leather, or the like.

Figure 1:
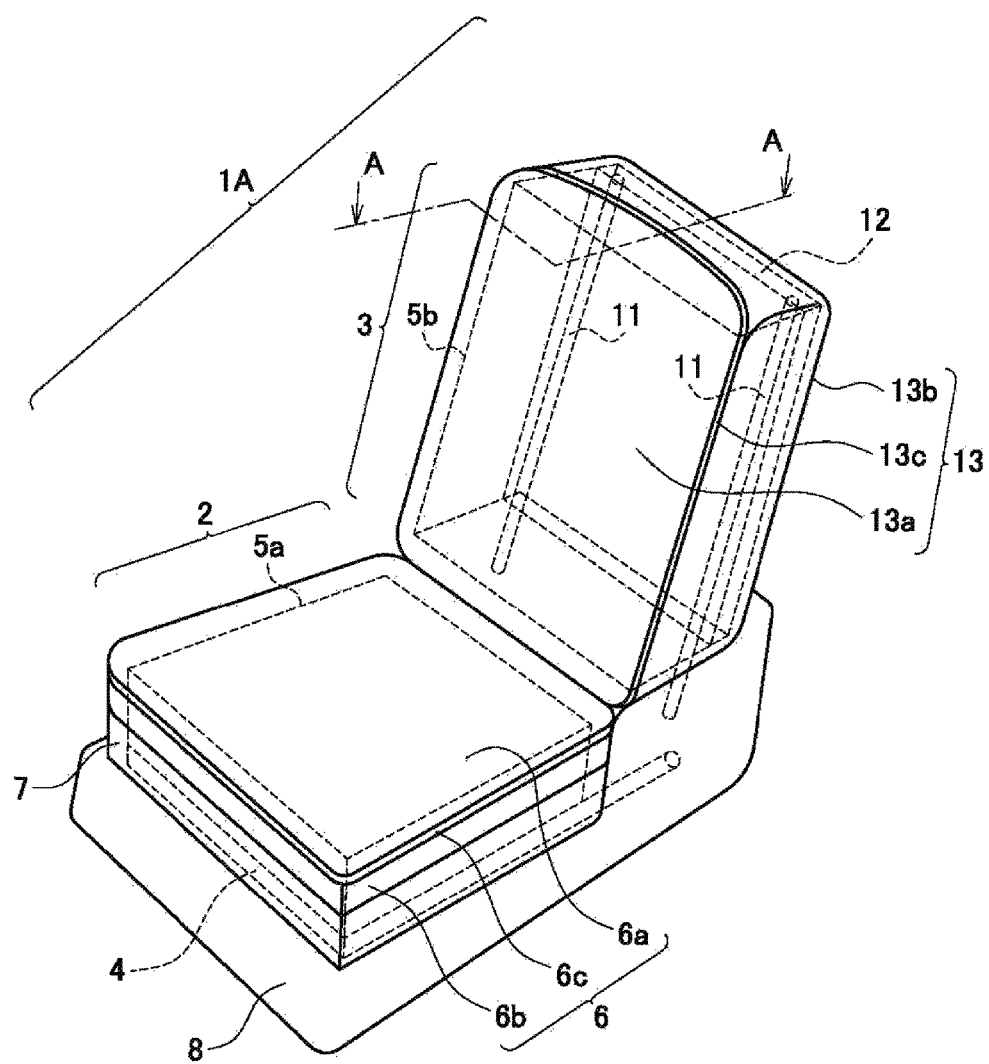
FIG. 1 is a perspective view showing an embodiment of a vehicular seat according to the present invention.

REFERENCE SIGNS LIST 1A, 1B: Vehicular seat, 2: Seat cushion, 3: Seat back, 4: Frame, 5a, 5b: Pad, 6: Surface skin, 6a: First surface skin, 6b: Second surface skin, 6c: Seam (junction portion), 7: Side cover, 8: Frame cover, 11: Pipe frame, 12: Backboard (base), 13: Surface skin, 13a: First surface skin, 13b: Second surface skin, 13c: Seam, 16: Protruding member, 16a: Shaft part, 16b: Head part, 17: Hole, 23: Seat back, 25b: Pad, 31: Pipe frame, 32: Backboard, 33: Surface skin, 33a: First surface skin, 33b: Second surface skin, 33c: Seam, 36: Protruding member, 36a: Shaft part, 36b: Head part, 37: Hole,

DESCRIPTION OF EMBODIMENTS

First Embodiment of Vehicular Seat

A vehicular seat according to the present invention is described below on the basis of the embodiments. As shall be apparent, the present invention is not limited to these embodiments. In some cases, constituent elements are shown in unrealistic ratios in order to make the characteristic portions easier to understand in the drawings accompanying the present description.

FIG. 1 shows an embodiment of a vehicular seat according to the present invention. The vehicular seat 1A shown herein has a seat cushion 2 and a seat back 3. The seat cushion 2 is a portion on which a person rests their gluteal area. The seat back 3 is a portion into which the sitter leans their back.

The seat cushion 2 has a frame 4 as a skeletal structure, a pad 5a fixed to the frame 4, a surface skin 6 that covers the pad 5a, a side cover 7 that covers the side surface of the frame 4, and a frame cover 8 that covers the lower portion of the frame 4. The frame 4 is formed from steel, a hard synthetic resin, or another highly rigid material. The pad 5a is a member that provides the sitter with cushioning, and is formed from, e.g., urethane, which is a foamed resin.

The surface skin 6 is formed from a first surface skin 6a and a second surface skin 6b. The first surface skin 6a is shaped to include a portion with which at least the gluteal area comes into contact when a person sits in the seat, and in the present embodiment the first surface skin is formed so as to have roughly the same shape as the top surface of the pad 5a. The second surface skin 6b has side parts that cover at least the front side part and the left and right side parts of the pad 5a, a junction part stitched together with the first surface skin 6a, and a connecting part bent inward from the front side part and both side pats, a protruding member (described hereinafter) being formed on the connecting part.

The end of the first surface skin 6a and the junction part of the second surface skin 6b are stitched together and connected by stitches in a seam 6c which is a junction section. This seam 6c is stitched on the inner sides of the first and second surface skins so as to not be visible from the outer side, for the sake of appearance.

The first surface skin 6a is formed from hide, leather, synthetic leather, a similar material, or a member combining these materials. The second surface skin 6b is formed from an elastomer, a soft resin, a molded nonwoven cloth, a similar material, a combination thereof, or another soft material. Elastomers are rubbery, elastic industrial materials, as is well known, an example of which could be an olefin-based thermoplastic elastomer. The side cover 7 and the frame cover 8 are formed by resin molding using a synthetic resin as a material.

The seat back 3 has pipe frames 11 as a skeletal structure, a backboard 12 supported by the pipe frames 11, a pad 5b fixed to the backboard 12, and an surface skin 13 that covers the pad 5b. The pipe frames 11 are pivotably linked to the frame 4 on the seat cushion 2 side by a reclining mechanism (not shown). The pipe frames 11 are formed from steel. The backboard 12 is formed from a hard synthetic resin. The pad 5b is a member that provides cushioning to the sitter, and is formed from, e.g., urethane, which is a foamed resin.

The surface skin 13 is formed from a first surface skin 13a and a second surface skin 13b. The first surface skin 13a and the second surface skin 13b are stitched together and connected by stitches in a seam 13c which is a junction section. The second surface skin 13b is connected to the peripheral edge of the first surface skin 13a. Specifically, the end of the second surface skin 13b is stitched to the peripheral edge of the first surface skin 13a.

The first surface skin 13a is formed from hide, leather, synthetic leather, a similar material, or a member combining these materials. The second surface skin 13b is formed from an elastomer, a soft resin, a molded nonwoven cloth, a similar material, or a combination thereof.

Figure 2:
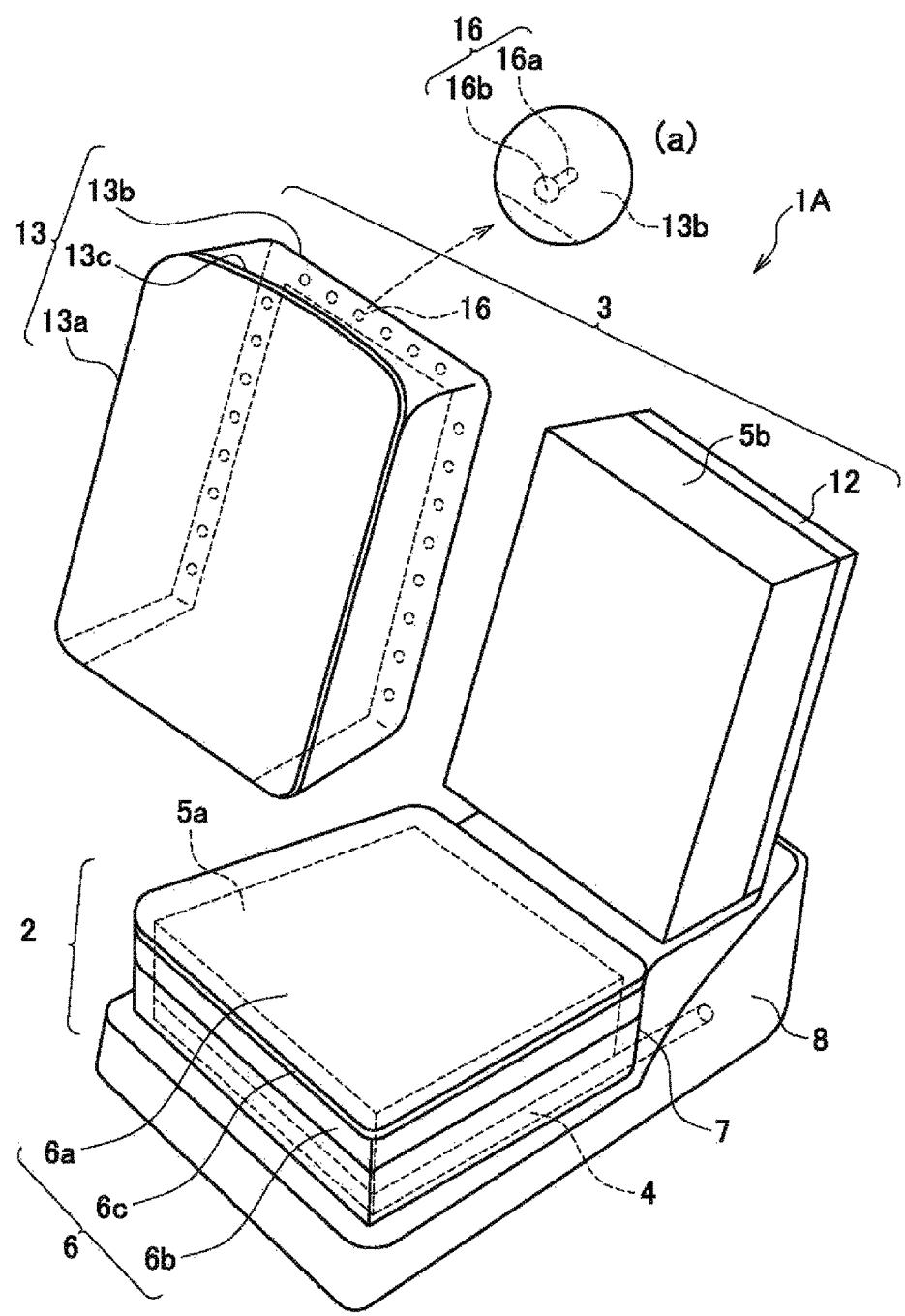
FIG. 2 is an exploded perspective view showing the surface skin as having been removed in the vehicular seat of FIG. 1.
Figure 3:
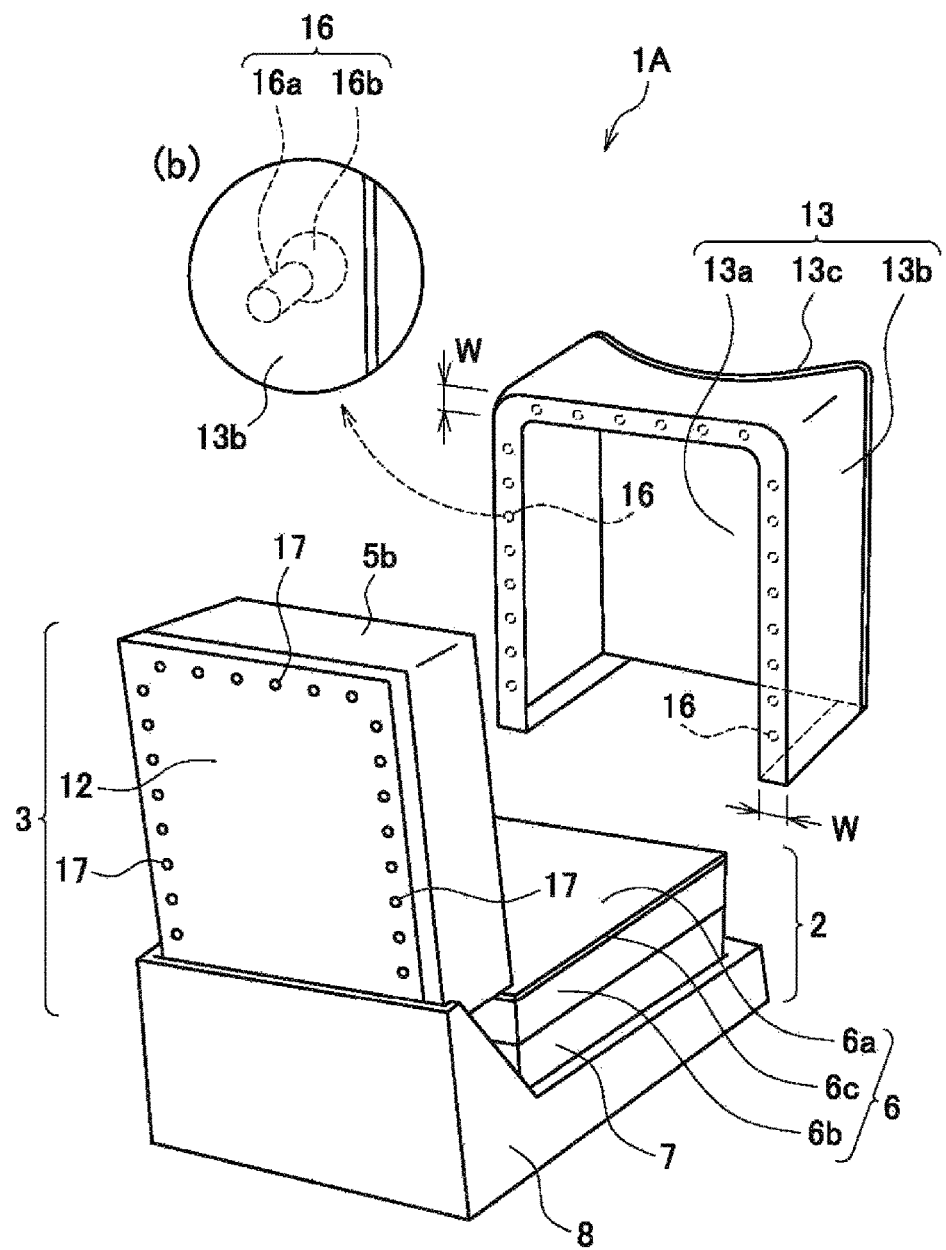
FIG. 3 is an exploded perspective view showing the vehicular seat of FIG. 2 as seen from the back.

FIG. 2 shows the vehicular seat 1A with the surface skin 13 of the seat back 3 removed from the backboard 12. FIG. 3 shows the vehicular seat 1A as seen from the back. In these drawings, the second surface skin 13b of the surface skin 13, due to being formed from, e.g., an elastomer, has shape maintainability such that the frame shape as illustrated is maintained in a natural state.

The surface of the second surface skin 13b on the side opposite the seam 13c is folded back inward at a predetermined width W. This folded part is provided with a plurality of protruding members 16. When the second surface skin 13b is manufactured by molding, these protruding members 16 are formed integrally with the second surface skin 13b, simultaneously and from the same material. As shown in the partial enlarged view (a) of FIG. 2 and the partial enlarged view (b) of FIG. 3, the protruding members 16 each have a shaft part 16a protruding toward the inside of the surface skin 13 and a head part 16b large in diameter and spherical in shape, as a large-diameter portion formed at the tip of the shaft part 16a. The term "large-diameter portion" means that it is larger in diameter than the shaft part 16a.

A plurality of holes 17 are provided in the peripheral edge on the back surface of the backboard 12 as shown in FIG. 3. The intervals of these holes 17 are the same as the intervals of the plurality of protruding members 16 provided to the surface skin 13. The diameter of each hole 17 is smaller than the diameter of the head part 16b of each protruding member 16 provided to the surface skin 13. Furthermore, the diameter of each hole 17 is set to be large enough for the head parts 16b of the protruding members 16 to pass through the holes 17 while elastically deforming when the head parts 16b are pushed into the holes with a predetermined pressing force.

In FIG. 3, the surface skin 13 is placed over the outer surface of the integrated structure of the backboard 12 and the pad 5b, and the head parts 16b of the protruding members 16 of the surface skin 13 are inserted with a predetermined pressing force into the holes 17 of the backboard 12, whereby the protruding members 16 and the holes 17 are engaged or in other words fitted together. This engagement allows the surface skin 13 to be mounted tightly on the outer surface of the integrated structure of the backboard 12 and the pad 5b, completing the vehicular seat 1A shown in FIG. 1. In the present embodiment, the connecting structure for connecting the backboard 12 as the base and the second surface skin 13b of the surface skin 13 is formed from the protruding members 16 provided to the second surface skin 13b of the surface skin 13, and the holes 17 provided to the backboard 12 as the base.

Figure 4:
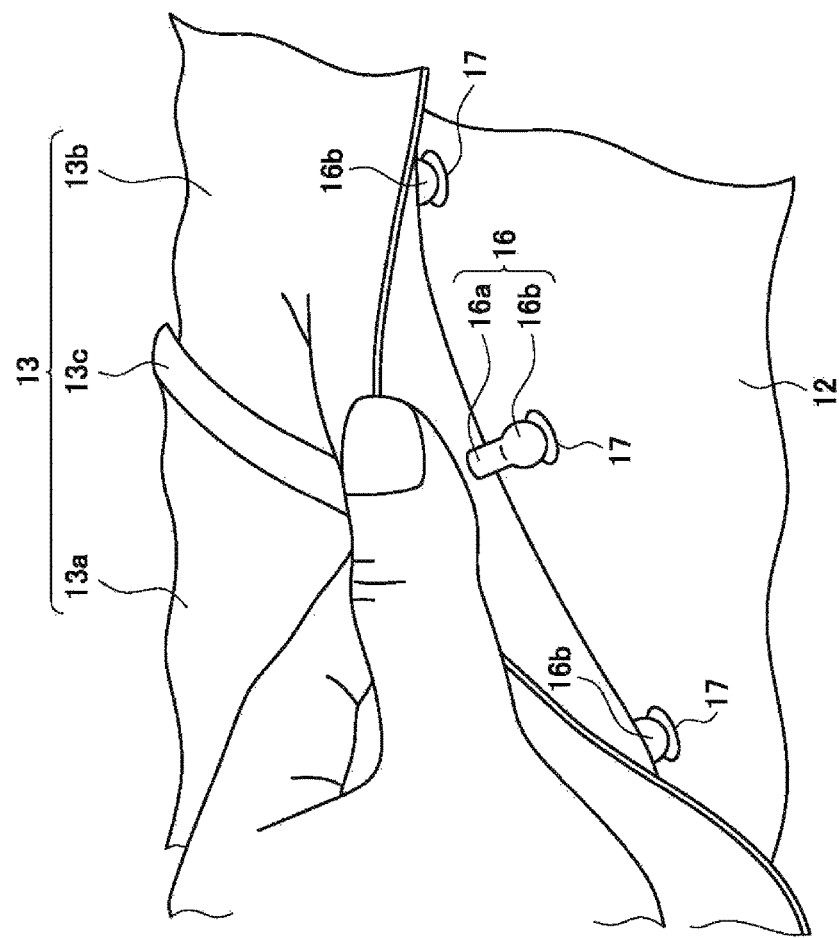
FIG. 4 is a perspective view showing part of the surface skin being turned over from the backboard.

FIG. 4 shows a hand turning over part of the tip of the second surface skin 13b of the surface skin 13 attached to the backboard 12. In FIG. 4, the head parts 16b of the protruding members 16 are pushed into the holes 17 provided in the peripheral edge of the backboard 12. Because the diameters of the head parts 16b are larger than the diameters of the holes 17, the pressed-in head parts 16b do not easily come out of the holes 17. The surface skin 13 is thereby firmly mounted on the backboard 12 so as to not easily come off.

Because the vehicular seat 1A of the present embodiment is configured in the above manner, there are significantly fewer components and cost is lower than in cases such as the vehicular seat disclosed in Patent Citation 1, which uses fastening means composed of screws, nuts, brackets, a hard plate, and the like.

Moreover, when the surface skin 13 is attached to the backboard 12 in FIG. 3, it is sufficient merely to insert the protruding members 16 on the surface skin 13 side into the holes 17 on the backboard 12 side, and assembly is significantly easier than when using fastening means composed of screws and the like.

In FIG. 1, the seat cushion 2 of the present embodiment has a surface skin end fixing structure similar to the surface skin end fixing structure described above. Specifically, a plurality of protruding members similar to the protruding members 16 shown in FIG. 4 are provided on the inner surface of the second surface skin 6b forming the surface skin 6. Holes similar to the holes 17 shown in FIG. 4 are provided in the peripheral edge portion of the top side of the side cover 7 of FIG. 1. The second surface skin 6b and the side cover 7 are connected by inserting the protruding members on the second surface skin 6b side into the holes in the side cover 7 as a base.

Second Embodiment of Vehicular Seat

Figure 5:
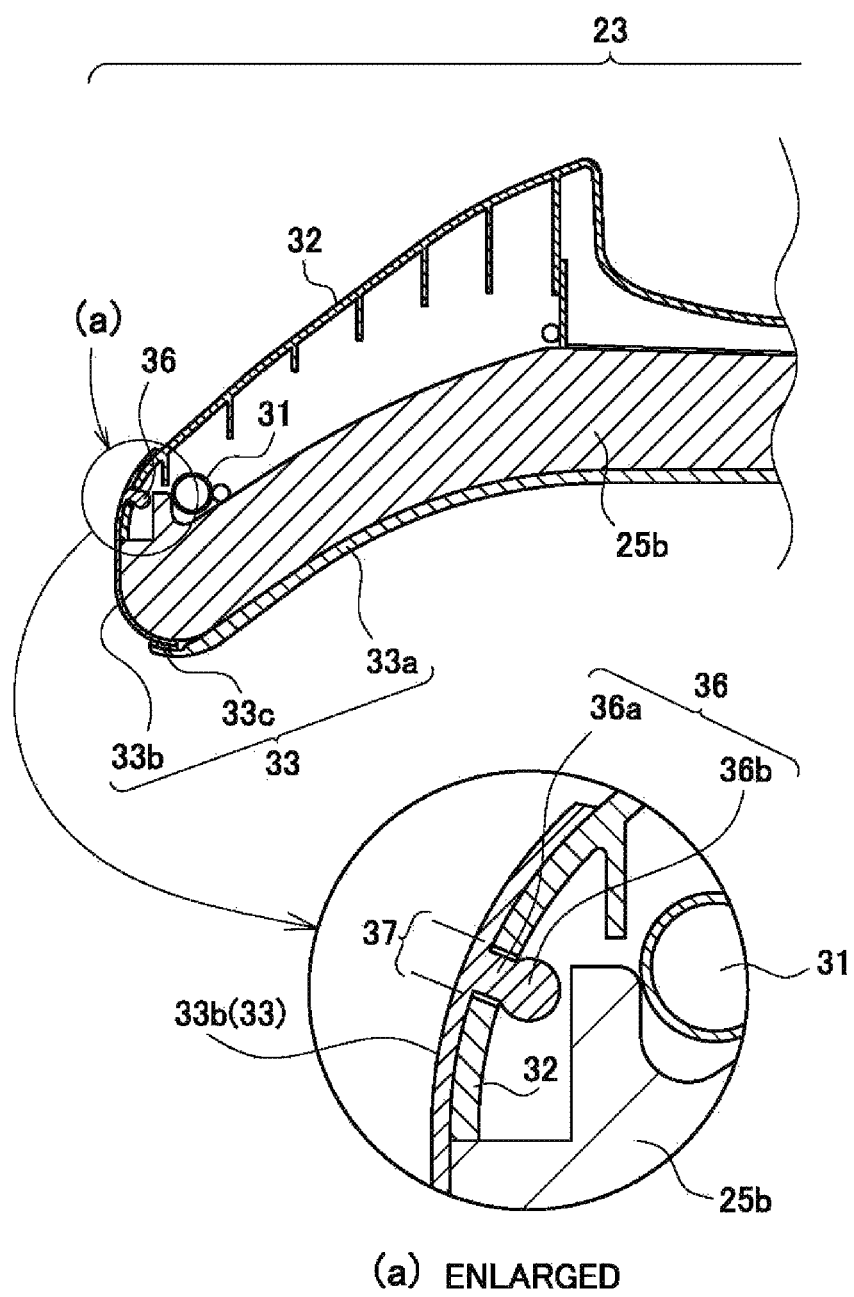
FIG. 5 is a cross-sectional plan view showing the main portion of another embodiment of the vehicular seat according to the present invention.

FIG. 5 shows the main portion of a second embodiment of a vehicular seat according to the present invention. Shown here is a portion of a seat back 23 constituting the vehicular seat. This portion is equivalent to the structure of the cross-sectional plan view of the portion along line A-A of FIG. 1.

The seat back 23 in the present embodiment has a pipe frame 31 as a skeletal structure, a backboard 32 supported by the pipe frame 31, a pad 25b fixed to the backboard 32, and a surface skin 33 that covers the pad 25b. The pipe frame 31 is formed from steel. The backboard 32 is formed from a hard synthetic resin. The pad 25b is a member that provides cushioning to the sitter, and is formed from, e.g., urethane, which is a foamed resin.

The surface skin 33 is formed from a first surface skin 33a and a second surface skin 33b. The first surface skin 33a and the second surface skin 33b are stitched together and connected by stitches in a seam 33c which is a junction section. The second surface skin 33b of the present embodiment does not have the clear folded part of the predetermined width W in the embodiment shown in FIG. 3.

The first surface skin 33a is formed from hide, leather, synthetic leather, a similar material, or a combination thereof. The second surface skin 33b is formed from an elastomer, a soft resin, a molded nonwoven cloth, a similar material, or a combination thereof.

In the present embodiment, the shape from the side surface of the pad 25b to the backboard 32 is a gently curved shape. The second surface skin 33b is formed into a curved shape that conforms to the pad 25b having this curved shape and to the outer surface of the side of the backboard 32.

In FIG. 5, the portion indicated by (a) is shown as an enlarged view (a). A circular hole 37 is provided in the side of the backboard 32 as shown in this enlarged view (a). A protruding member 36 is provided in the inner surface of the peripheral edge of the second surface skin 33b. The protruding member 36 has a shaft part 36a protruding toward the inside of the surface skin 33, and a head part 36b of large diameter and spherical shape, as a large-diameter portion formed at the tip of the shaft part 36a.

In the present embodiment, the protruding member 36 is provided not in the bent portion having the width W of the second surface skin 13b as in the previous embodiment shown in FIG. 3, but in the smoothly curved portion of the second surface skin 33b. The protruding member 36 then fits into the side of the backboard 32 from the side.

Because the seat back 23 of the previous embodiment is configured in the above manner, there are significantly fewer components and cost is lower than in cases such as the vehicular seat disclosed in Patent Citation 1, which uses fastening means composed of screws, nuts, brackets, a hard plate, and the like.

Moreover, when the surface skin 33 is attached to the backboard 32, it is sufficient to merely insert the protruding member 36 on the surface skin 33 side into the hole 37 on the backboard 32 side, and ease of assembly is significantly improved over cases of using fastening means composed of screws and the like.

Third Embodiment of Vehicular Seat

Figure 6:
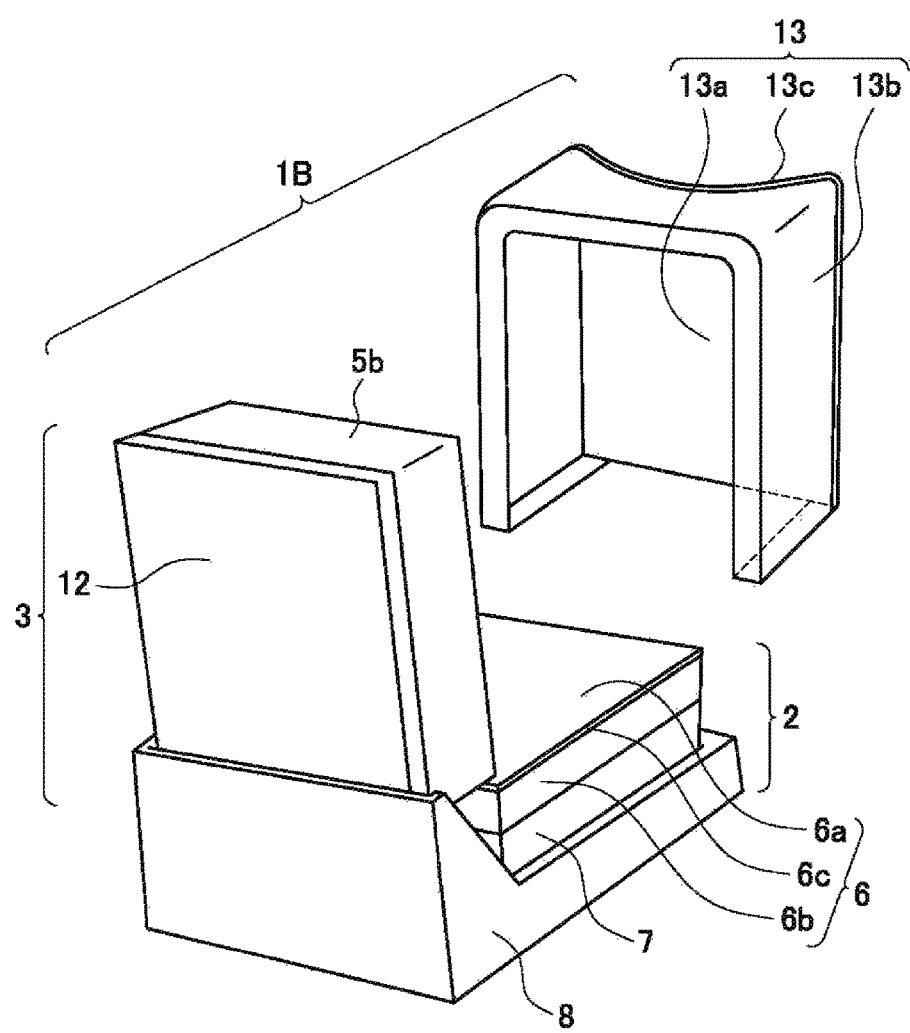
FIG. 6 is an exploded perspective view showing yet another embodiment of the vehicular seat according to the present invention.

FIG. 6 shows a third embodiment of a vehicular seat according to the present invention. In this embodiment, the same members as those of the previous embodiment shown in FIG. 3 are denoted by the same symbols, and descriptions thereof are omitted. The vehicular seat 1B according to the present embodiment differs from the vehicular seat 1A according to the previous embodiment shown in FIG. 3 in that the protruding members 16 of FIG. 3 are not provided to the second surface skin 13b of the surface skin 13, and the holes 17 of FIG. 3 are not provided to the backboard 12 of the seat back 3 of FIG. 6.

The second surface skin 13b of the present embodiment is formed from a material that is soft yet can maintain the illustrated frame shape in its natural state. When the surface skin 13 is then placed over the integrated structure composed of the backboard 12 and the pad 5b to complete the seat back 3 as shown in FIG. 1, the surface skin 13 is firmly attached to the outer surface of the integrated structure of the backboard 12 and the pad 5b by the force with which the surface skin 13 attempts to maintain its shape.

With the vehicular seat 1B of the present embodiment, there are significantly fewer components and cost is lower than in cases such as the vehicular seat disclosed in Patent Citation 1, which uses fastening means composed of screws, nuts, brackets, a hard plate, and the like. Moreover, when the surface skin 13 is attached to the backboard 12, it is sufficient merely to place the surface skin 13 over the integrated structure of the backboard 12 and the pad 5b, and assembly is significantly easier than when using fastening means composed of screws and the like.

Other Embodiments

The present invention was described above using preferred embodiments as examples, but the present invention is not limited to these embodiments, and various modifications can be made within the scope of the invention set forth in the claims.

For example, in the embodiment shown in FIG. 3, the protruding members 16 are provided to the surface skin 13 and the holes 17 are provided to the backboard 12, but conversely, the protruding members 16 may be provided to the backboard 12 and the holes 17 may be provided to the surface skin 13.

In the embodiment shown in FIG. 5, one piece of a connecting structure is formed from protruding members 16 having a large-diameter portion (i.e., the head parts 16b) at the tip, but protruding members having no large-diameter portion at the tip can also be the piece of a connecting structure.

Another connecting structure that can be used is one in which metal hook members are used in place of the protruding members 16, and the hook members are fitted into holes in an opposing component.

In the embodiment shown in FIG. 1, the base to which the surface skin 13 is attached is formed from the backboard 12. However, the pipe frames 11 themselves can instead be the base. Alternatively, the base can be configured from a backboard that itself functions as a frame as a skeletal structure without being supported on the pipe frames 11.

In the embodiment of FIG. 3, the protruding members 16 are provided to the folded part having the width W in the second surface skin 13b, but the protruding members 16 can instead be provided to the peripheral edge of the second surface skin 13b in proximity to the folded part. Furthermore, the protruding members 16 can be provided to the peripheral edge of the second surface skin 13b without any folded part.

In the embodiments described above, the surface skin of the seat back and the surface skin of the seat cushion are separate members, but may also be formed as a single integrated member. In this case, it is preferable in terms of improving ease of assembly for the first surface skins 6a and 13a to be formed integrally or stitched together so as to be integrated, and the second surface skins 6b and 13b to be separate from each other.

The invention claimed is:

1. A vehicular seat comprising a surface skin for covering a pad and a backboard to which the surface skin is attached, the surface skin being attached to a peripheral edge of the backboard, wherein:
   the surface skin comprises a first surface skin and a second surface skin that is connected to the first surface skin;
   a connecting structure for connecting the backboard and the second surface skin is provided;
   the second surface skin is formed from an elastomer;
   the elastomer has shape-retaining properties such that the shape thereof can be maintained in a natural state;
   the second surface skin is connected to a peripheral edge of the first surface skin;
   an end of the second surface skin is stitched to the peripheral edge of the first surface skin;
   the connecting structure comprises:
      protruding members provided to the second surface skin; and
      holes provided to a peripheral edge on the back surface of the backboard;
   the second surface skin is connected to the peripheral edge on the back surface of the backboard by the protruding members being inserted into the holes;
   the second surface skill comprises a bent portion bent along the peripheral edge on the back surface of the backboard, due to the shape-retaining properties;
   the protruding members are provided on the inner surface of the bent portion;
   the protruding members are formed from the same material as the second surface skin;
   the second surface skin covers an entire area of the side surface of the pad;
   the second surface skin which covers a side surface of the pad and the bent portion of the second surface skin are visible from an exterior; and a connecting portion between the first surface skin and the second surface skin is placed on a boundary portion between a front surface of the pad and the side surface of the pad.

2. The vehicular seat according to claim 1, wherein:
the tips of the protruding members comprise large-diameter portions; and
the large-diameter portions are larger in diameter than the holes and are shaped to be able to pass through the holes.

3. The vehicular seat according to claim 1, wherein a material of the first surface skin is different from the elastomer of the second surface skin.

4. The vehicular seat according to claim 1, wherein the first surface skin and the second surface skin are stitched together and connected by stitches in a seam which comprises a junction section,
wherein the second surface skin is connected to the peripheral edge of the first surface skin, and
wherein an end of the second surface skin is stitched to the peripheral edge of the first surface skin.

5. The vehicular seat according to claim 4, wherein the surface of the second surface skin on a side opposite the seam is folded back inward, relative to the side opposite the seam, at a predetermined width.

6. The vehicular seat according to claim 1, wherein intervals of the holes are same as intervals of the protruding members provided to the surface skin.

7. The vehicular seat according to claim 1, wherein the second surface skin is mounted on a whole side surface of the pad due to a force caused by the shape-retaining properties thereof.

8. The vehicular seat according to claim 1, wherein the second surface skin is rigidly attached to the pad due to a force caused by the shape-retaining properties thereof.

9. A vehicular seat comprising a surface skin for covering a pad and a backboard to which the surface skin is attached, the surface skin being attached to a peripheral edge of the backboard, wherein:
the surface skin comprises a first surface skin and a second surface skin that is connected to the first surface skin;
a connecting structure for connecting the backboard and the second surface skin is provided;
the second surface skin is formed from an elastomer;
the elastomer has shape-retaining properties such that the shape thereof can be maintained in a natural state;
the second surface skin is connected to a peripheral edge of the first surface skin;
an end of the second surface skin is stitched to the peripheral edge of the first surface skin;
the connecting structure comprises:
protruding members provided to the second surface skin; and
holes provided to a peripheral edge on the back surface of the backboard;
the second surface skin is connected to the peripheral edge on the back surface of the backboard by the protruding members being inserted into the holes;
the second surface skin comprises a bent portion bent along the peripheral edge on the back surface of the backboard, due to the shape-retaining properties;
the protruding members are provided on the inner surface of the bent portion;
the protruding members are formed from the same material as the second surface skin;

the second surface skin covers an entire area of the side surface of the pad; and
the second surface skin which covers a side surface of the pad and the bent portion of the second surface skin are visible from an exterior.

10. The vehicular seat according to claim 9, wherein the first surface skin and the second surface skin are stitched together and connected by stitches in a seam which comprises a junction section,
wherein the second surface skin is connected to the peripheral edge of the first surface skin, and
wherein an end of the second surface skin is stitched to the peripheral edge of the first surface skin.

11. The vehicular seat according to claim 10, wherein the surface of the second surface skin on a side opposite the seam is folded back inward, relative to the side opposite the seam, at a predetermined width.

12. The vehicular seat according to claim 9, wherein the second surface skin is mounted on a whole side surface of the pad due to a force caused by the shape-retaining properties thereof.

13. The vehicular seat according to claim 9, wherein the second surface skin is rigidly attached to the pad due to a force caused by the shape-retaining properties thereof.

14. A vehicular seat comprising a surface skin for covering a pad and a backboard to which the surface skin is attached, the surface skin being attached to a peripheral edge of the backboard, wherein:
the surface skin comprises a first surface skin and a second surface skin that is connected to the first surface skin;
a connecting structure for connecting the backboard and the second surface skin is provided;
the second surface skin is formed from an elastomer;
the elastomer has shape-retaining properties such that the shape thereof can be maintained in a natural state;
the second surface skin is connected to a peripheral edge of the first surface skin;
an end of the second surface skin is stitched to the peripheral edge of the first surface skin;
the connecting structure comprises:
protruding members provided to the second surface skin; and
holes provided to a peripheral edge on the back surface of the backboard;
the second surface skin is connected to the peripheral edge on the back surface of the backboard by the protruding members being inserted into the holes;
the second surface skin comprises a bent portion bent along the peripheral edge on the back surface of the backboard, due to the shape-retaining properties;
the protruding members are provided on the inner surface of the bent portion;
the protruding members are formed from the same material as the second surface skin;
a connecting portion between the first surface skin and the second surface skin is placed on a boundary portion between a front surface of the pad and the side surface of the pad; and
the second surface skin covers an entire area of the side surface of the pad.

15. The vehicular seat according to claim 14, wherein the first surface skin and the second surface skin are stitched together and connected by stitches in a seam which comprises a junction section,
wherein the second surface skin is connected to the peripheral edge of the first surface skin, and wherein an end of e second surface skin is stitched to the peripheral edge of the first surface skin.

16. The vehicular seat according to claim 15, wherein the surface of the second surface skin on a side opposite the seam is folded back inward, relative to the side opposite the seam, at a predetermined width.

17. The vehicular seat according to claim 14, wherein the second surface skin is mounted on a whole side surface of the pad due to a force caused by the shape-retaining properties thereof.

18. The vehicular seat according to claim 14, wherein the second surface skin is rigidly attached to the pad due to a force caused by the shape-retaining properties thereof.

* * * * *